Aug. 8, 1961          G. H. THOMPSON          2,994,954
                       PRUNING SHEARS
                    Filed March 21, 1960

INVENTOR
GEORGE H. THOMPSON
BY
ATTORNEY

United States Patent Office 2,994,954
Patented Aug. 8, 1961

---

2,994,954
PRUNING SHEARS
George H. Thompson, Rte. 1, Box 3000, Fair Oaks, Calif.
Filed Mar. 21, 1960, Ser. No. 16,390
4 Claims. (Cl. 30—231)

This invention relates to improvements in pruning shears, particularly related to the pruning of trees and tall shrubs, and provides a shear of increased power for trimming off heavier branches and making the trimming of lighter branches and twigs easier and with less effort, and also provides a shear in which the connections from operating handle to shear head are enclosed within the handle so that the shear is inserted and retracted from among branches and twigs without obstruction or catching, and furthermore provides a shear which is more easily held and stabilized during operations because of a band which engages over the arm adjacent to the elbow.

The objects and advantages of the invention are as follows:

First, to provide a pruning shear requiring less effort for operation as related to existing types.

Second, to provide a pruning shear as outlined in which the operative connections between the operating lever and the shear head are enclosed within the handle to provide for free and unobstructed operation among branches.

Third, to provide a pruning shear with an arm band to engage about the arm of the user adjacent to the elbow, and to provide a handle for gripping by the hand, for easier and more convenient use of the shear.

In describing the invention reference will be had to the accompanying drawings, in which.

This invention consists of a pruning shear with increased leverage for cutting off heavier branches and twigs and for easier cutting of smaller ones, and also provides an arm band at the end of the staff to engage about the arm adjacent to the elbow with a handle suitably located for gripping by the hand, making the pruning shear easier and more convenient to use.

Figure 1:
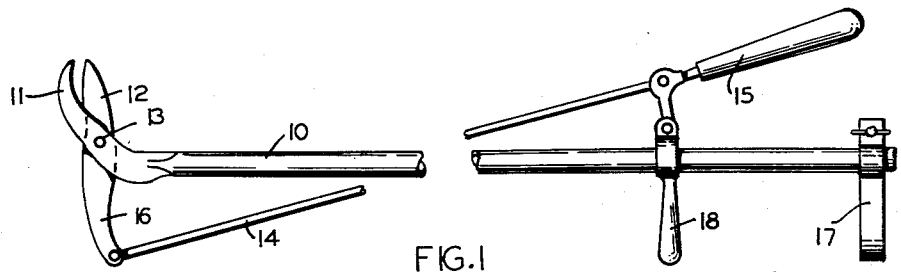
FIG. 1 is a side elevation of a somewhat conventional type of pruning shear with the increased leverage, the arm band, and depending handle applied thereto.

Considering FIG. 1, the conventional pruning shear has a staff 10, a shear head with shear blades 11 and 12 which are pivoted together at 13, and an operative connection 14 from the movable shear blade 12 to the operating lever 15 and which is pivoted to the staff. With this arrangement, twigs and branches get snagged between the staff 10 and connection 14 and particularly at 16, which causes considerable inconvenience, takes extra time for pruning and thus increasing the cost and causing delay in the completion of the pruning process in extensive orchards and plantations. However, even this type can be improved on by my invention by increasing the leverage ratio between the operating lever and the shear head, and by the application of the arm band 17 and handle or hand grip 18, the hand grip being fixed in position while the arm band 17 is adjustable on the staff to suit the user.

Figure 2:
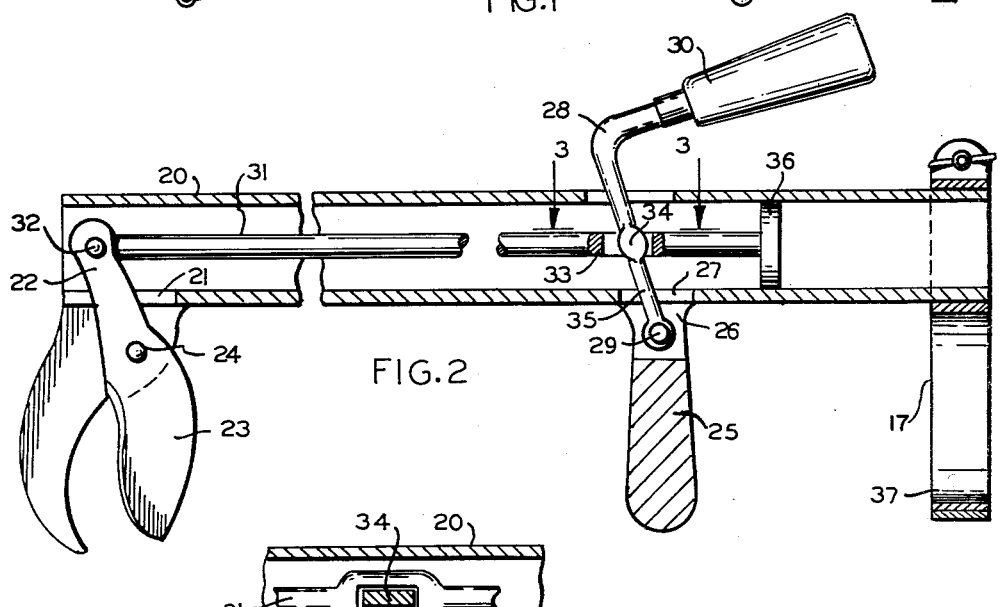
FIG. 2 is a longitudinal section through one form of the invention with enclosed operating connections, arm band, and depending handle for gripping by the hand.
Figure 3:
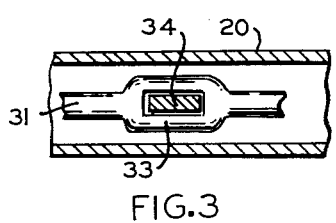
FIG. 3 is a fragmentary section taken on line 3—3 of FIG. 2.

The preferred form of the invention is illustrated in FIG. 2 in which the stationary blade 19 is fixed to the tubular staff 20, the head end of which is slotted as indicated at for the lever end 22 of the movable shear blade 23 which is pivoted to the stationary blade at 24.

A hand grip 25 is slotted as indicated at 26 and is fixed to the staff 20 in which the slot 27 is formed in registry with the slot 26, and the operating lever 28 is pivoted in this slot as indicated at 29, this operating lever having a handle 30.

A connecting rod 31 has one end pivotally connected to the lever end 22 of the movable blade as indicated at and is provided with a yoke 33 in which the arcuate enlargement 34 of the lever 28 operates, the length of the lever arm 35 being only about one-half that of the lever arm 22, thus compounding the leverage. A bearing member 36 is provided for maintaining the rod 31 in an axial position as previously mentioned, the arm band 17 is adjustable on the staff merely through operation of the wing nut and sliding the band to position. The band is also adjustable as to diameter as indicated by the overlapping portions at 37.

Thus a pruning shear is provided which is more easily and conveniently used and requiring less effort in cutting off small branches and twigs while also making it possible to cut off heavier branches than with conventional pruning shears.

Furthermore, there is no snagging or tangling in the branches and twigs as is so prevalent with conventional types because the operating mechanism for the shear blade is enclosed in the staff, the only exposed mechanism being the shear head and the operating lever.

I claim:
1. In a pruning shear having a shear head, a staff, and an operating lever; a hand grip on said staff, and an arm band in spaced relation thereto to fit about the arm of the user when the hand grip is gripped, to provide for more expeditious directing of the shear head for pruning.

2. A structure as defined in claim 1, said hand grip being fixed to said staff, and said arm band being adjustable relative to the hand grip on said staff.

3. A pruning shear having a shear head including a fixed blade and a movable blade, a tubular shaft, an operating lever mounted on said staff, and an operative connection from said operating lever to said movable blade and entirely enclosed within said staff, for nonobstructional use in pruning, a hand grip fixed on said staff, and an arm band mounted on said staff in spaced relation to said hand grip for increased stabilization of the pruning shear during pruning operations.

4. A pruning shear having a shear head including a fixed blade and a movable blade, a tubular staff, an operating lever mounted on said staff, and an operative connection from said operating lever to said movable blade and entirely enclosed within said staff, for nonobstructional use in pruning, a hand grip fixed on said staff, and an arm band adjustably mounted on said staff in spaced relation to said hand grip, with the arm band adjustable relative to the hand grip.

References Cited in the file of this patent
UNITED STATES PATENTS

| | | |
|---|---|---|
| 160,454 | Miller | Mar. 2, 1875 |
| 2,493,696 | Potstada | Jan. 3, 1950 |
| 2,504,405 | Fletcher | Apr. 18, 1950 |
| 2,602,994 | McGary et al. | July 19, 1952 |